United States Patent [19]

Flugger

[11] Patent Number: 5,216,883
[45] Date of Patent: Jun. 8, 1993

[54] HEADER ASSEMBLY FOR INTERNAL COMBUSTION ENGINE AND METHOD

[75] Inventor: Ray T. Flugger, Santa Rosa, Calif.

[73] Assignee: Flowmaster, Inc., Santa Rosa, Calif.

[21] Appl. No.: 939,833

[22] Filed: Sep. 2, 1992

Related U.S. Application Data

[63] Continuation of Ser. No. 566,983, Aug. 13, 1990, abandoned.

[51] Int. Cl.$^5$ .............................................. F02B 27/04
[52] U.S. Cl. ........................................ 60/313; 60/323
[58] Field of Search ................. 60/313, 312, 314, 323, 60/324

[56] References Cited

U.S. PATENT DOCUMENTS

| | | | |
|---|---|---|---|
| 3,254,484 | 6/1966 | Kopper | 60/275 |
| 4,342,195 | 8/1982 | Lo | 60/313 |
| 4,484,440 | 11/1984 | Oki et al. | 60/276 |
| 4,574,914 | 3/1986 | Flugger | 181/268 |
| 4,621,494 | 11/1986 | Fujita | 60/313 |
| 4,693,076 | 9/1987 | Chujo et al. | 60/274 |
| 4,703,619 | 11/1987 | Chujo et al. | 60/274 |
| 4,723,408 | 2/1988 | Nagai et al. | 60/274 |
| 4,747,265 | 5/1988 | Nagai et al. | 60/274 |
| 4,819,427 | 4/1989 | Nagai et al. | 60/274 |
| 4,831,838 | 5/1989 | Nagai et al. | 60/274 |
| 5,123,502 | 6/1992 | Flugger | 181/264 |

FOREIGN PATENT DOCUMENTS

| | | | |
|---|---|---|---|
| 0284466 | 9/1988 | European Pat. Off. | 60/313 |
| 0943463 | 11/1948 | France | 60/313 |
| 0046011 | 3/1982 | Japan | 60/313 |
| 0143119 | 9/1982 | Japan | 60/313 |
| 0088816 | 5/1985 | Japan | 60/313 |
| 61-234241 | 10/1986 | Japan | |
| 62-29738 | 2/1987 | Japan | |
| 62-147034 | 7/1987 | Japan | |
| 0019453 | 2/1908 | United Kingdom | 60/313 |

OTHER PUBLICATIONS

Scientific Design of Exhaust and Intake Systems, Smith and Morrison, Third Ed., Rohen Baily, a copyright 1971 pp. 92, 100–102 & 179.

Exhibit 1, Response Dated Dec. 30, 1991, Flowmaster Mufflers advertisement "Scott Sharp, Camaro & Flowmaster won the 1991 Trans-AM Series!".

Exhibit 2, Response Dated Dec. 30, 1991, Flowmaster products catalogue, p. 17, "Force II Savenger Series Collectors".

Exhibit 3, Response Dated Dec. 30, 1991, advertising flier by Flowmaster, Inc. "Flowmaster's Pulse-Tech Collector Gave Me 20 to 25 HP Without Any Other Changes!".

Exhibit 4, Response Dated Dec. 30 1991, article in the Nov., 1991 issue of *Super Chevy*, entitled "Scavenger Hunt."

*Primary Examiner*—Ira S. Lazarus
*Assistant Examiner*—L. Heyman
*Attorney, Agent, or Firm*—Flehr, Hohbach, Test, Albritton & Herbert

[57] ABSTRACT

A header assembly for an internal combustion engine including a pair of header pipes having discharge ends, a collector mounted on the discharge ends and having a housing directing exhaust gas pulses from both of the pipes to an outlet. The collector is formed to produce the flow of exhaust pulses in a manner fluid coupling out-of-phase exhaust gas pulses in each of the pipes to the others by an amount sufficient to increase horsepower of the engine at substantially all normal operating speeds. The header pipes proximate the inlet to the header collector are formed for discharge of gases along a common interface or boundary of substantial transverse length to effect fluid coupling. Additionally, the collector is free of channeling or protrusions to permit unconstrained transverse expansion of the pulses across the adjacent header pipe. A method of increasing engine horsepower by fluid coupling together header pipes also is described.

20 Claims, 10 Drawing Sheets

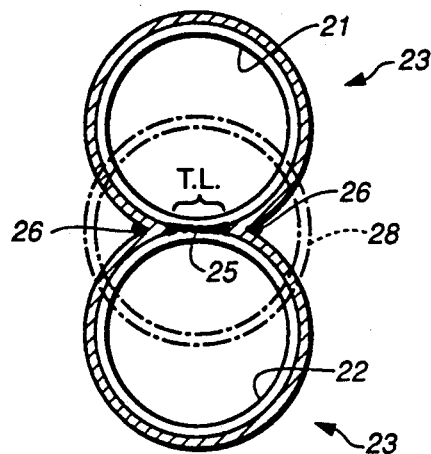
FIG._1A (PRIOR ART)
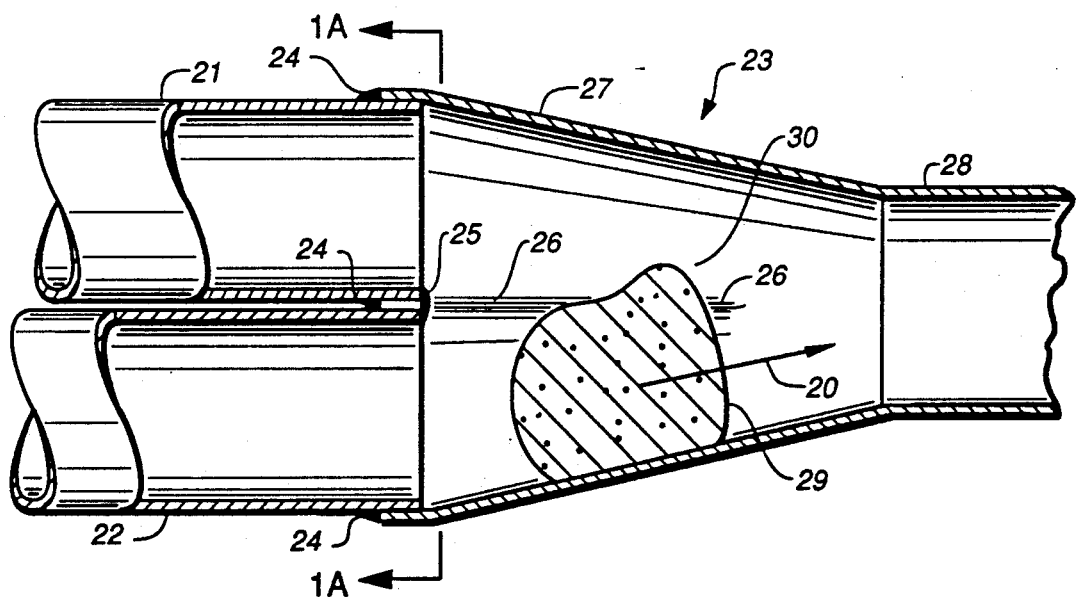
FIG._1 (PRIOR ART)

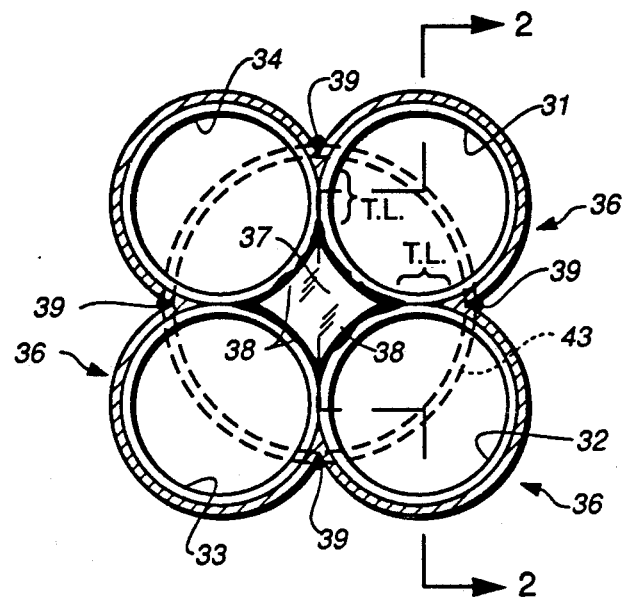
FIG._2A (PRIOR ART)
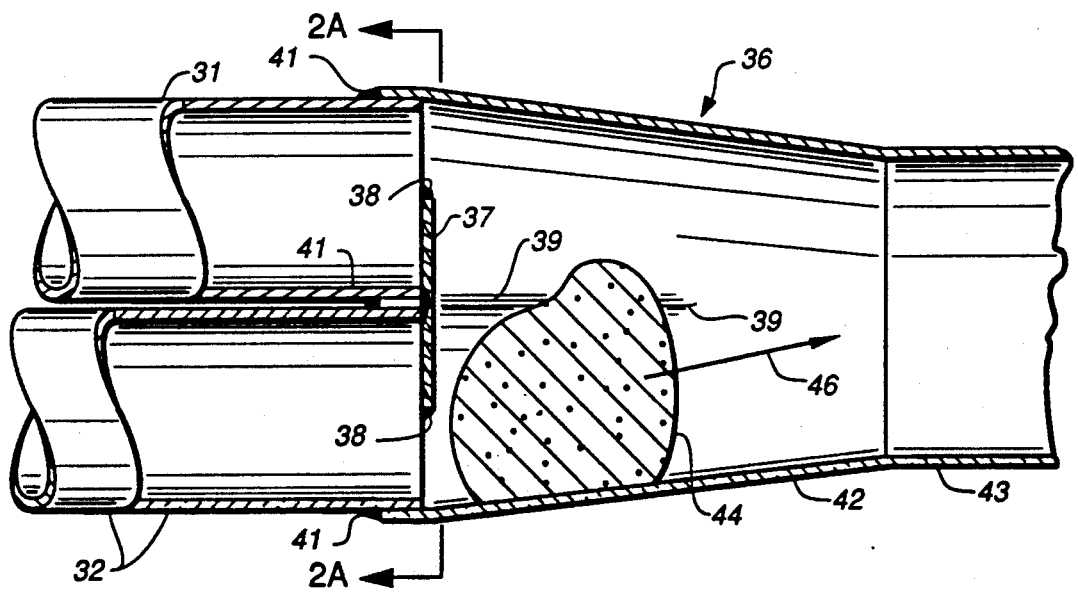
FIG._2 (PRIOR ART)

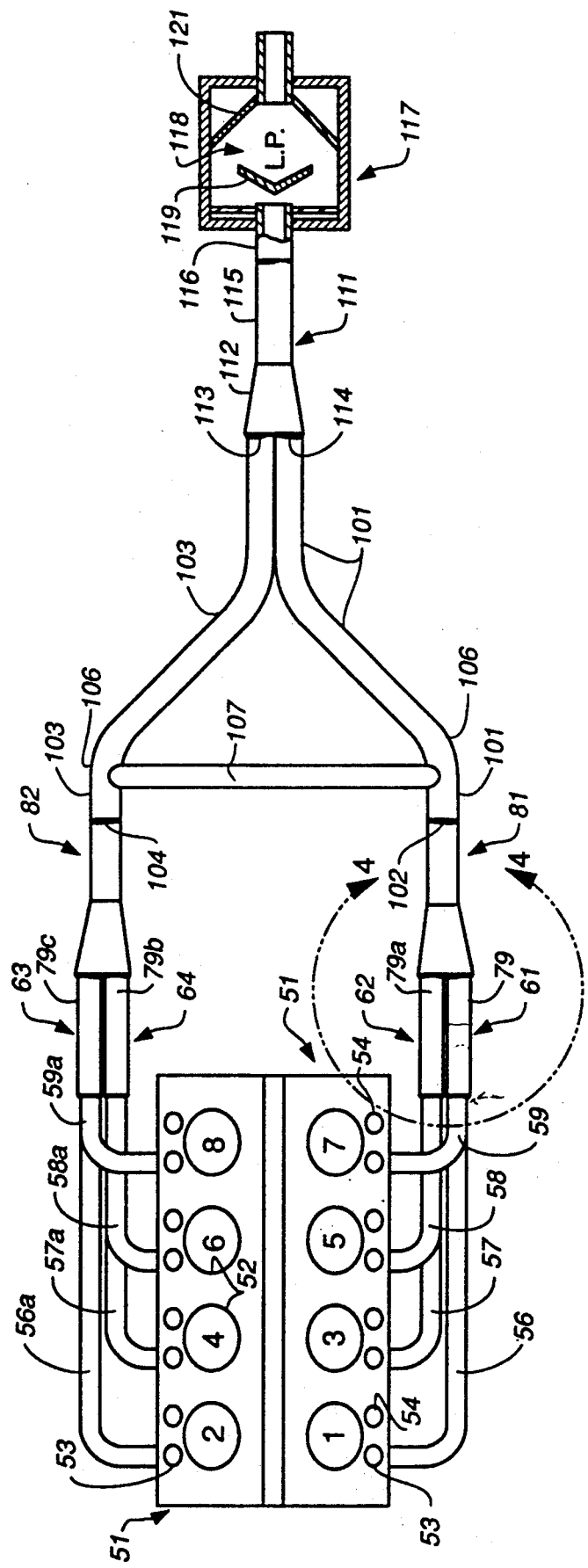
FIG._3

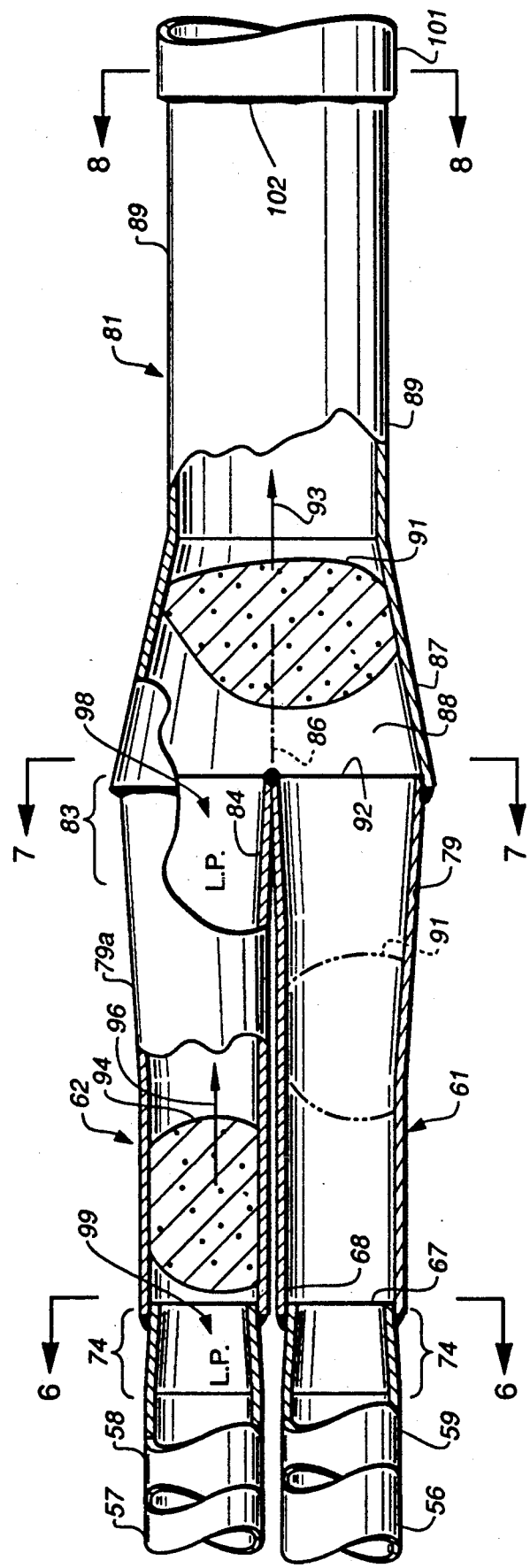
FIG._4

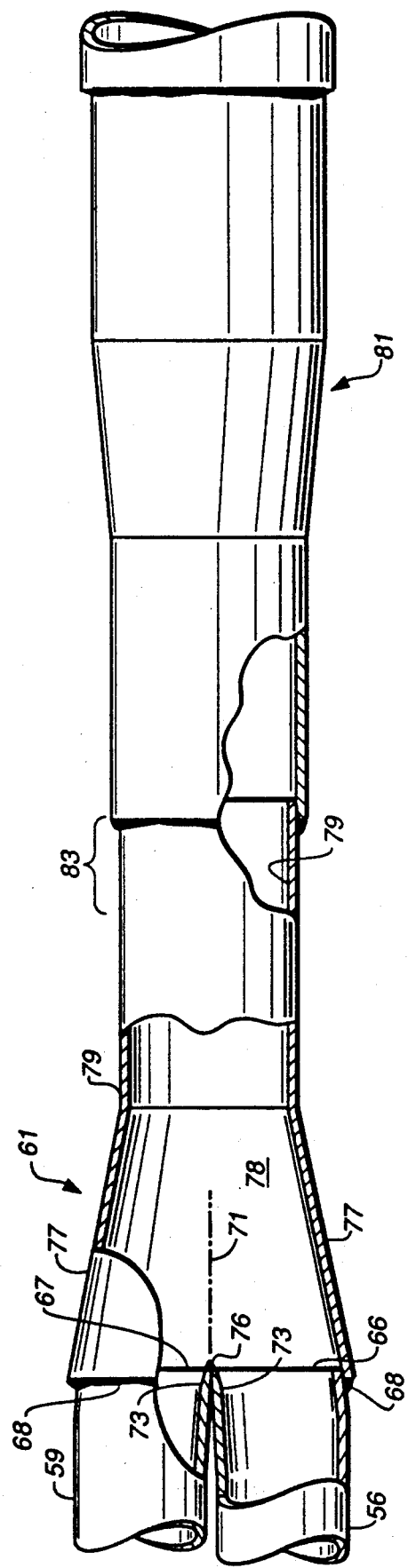
FIG._5

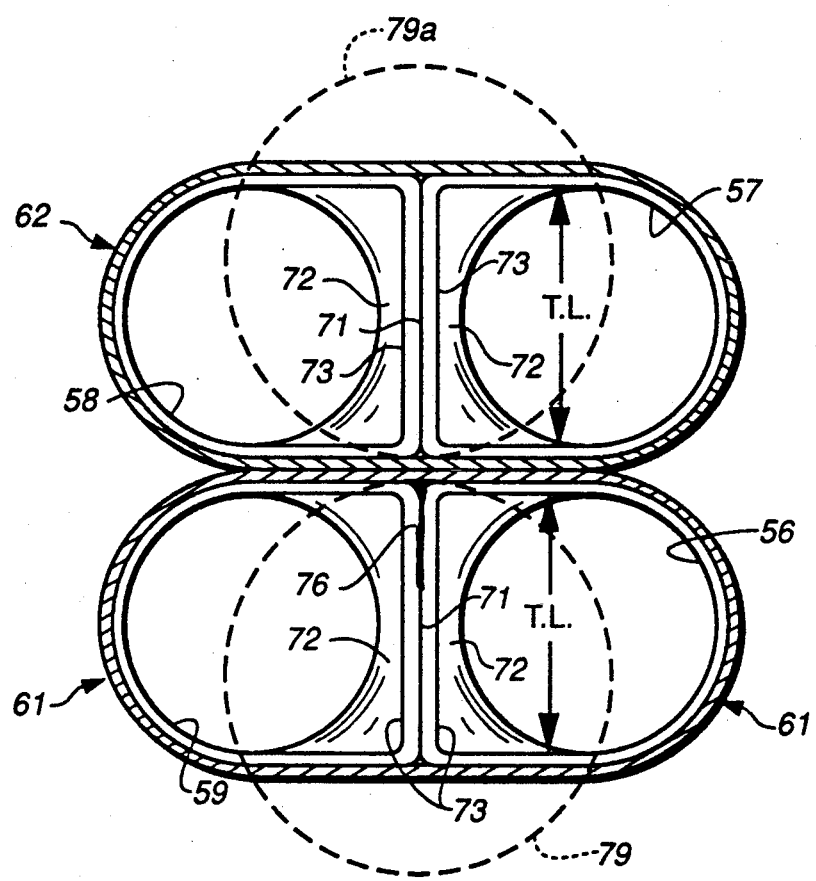
FIG._6

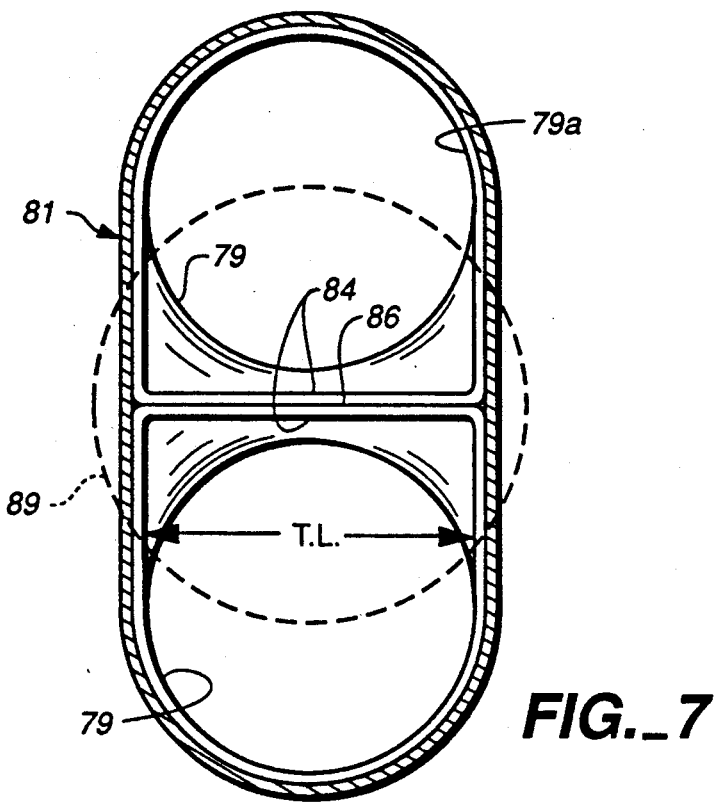
FIG._7
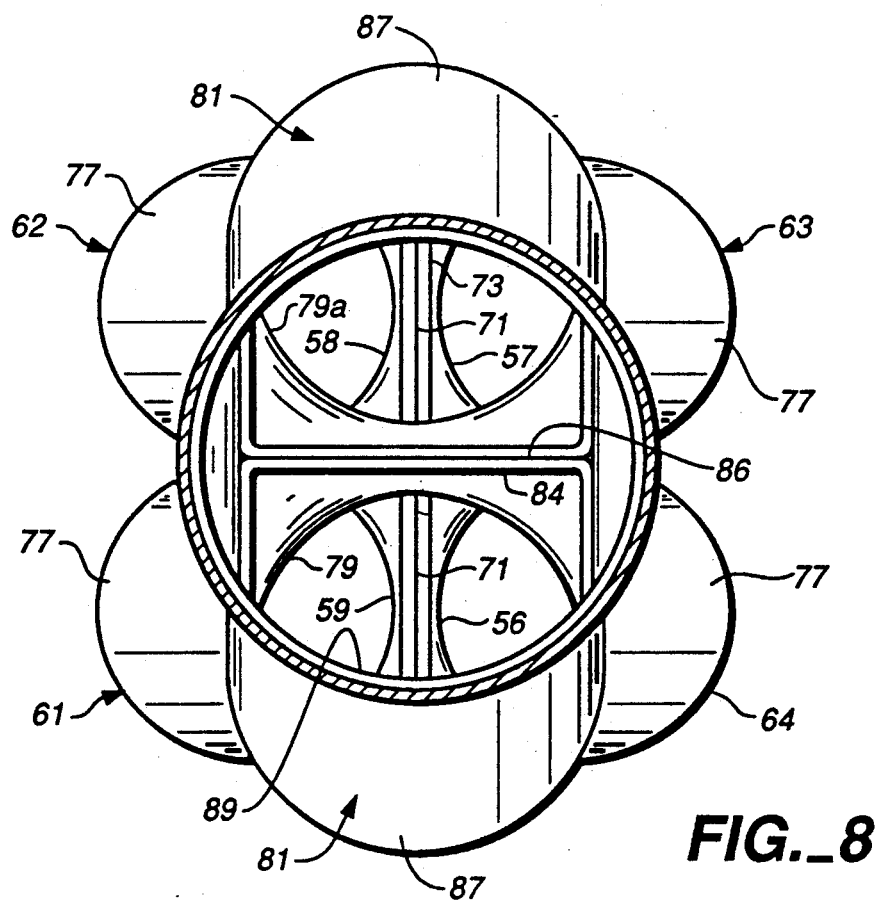
FIG._8

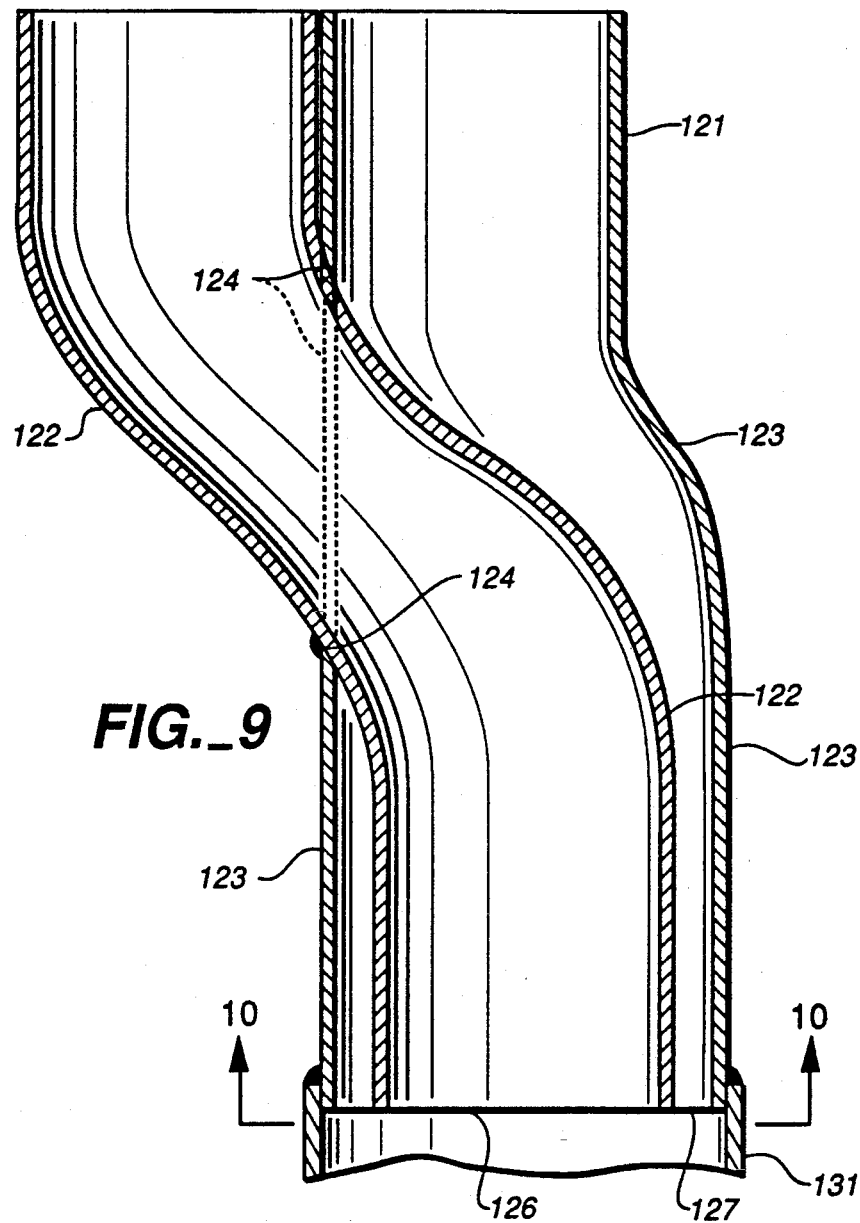
FIG._9
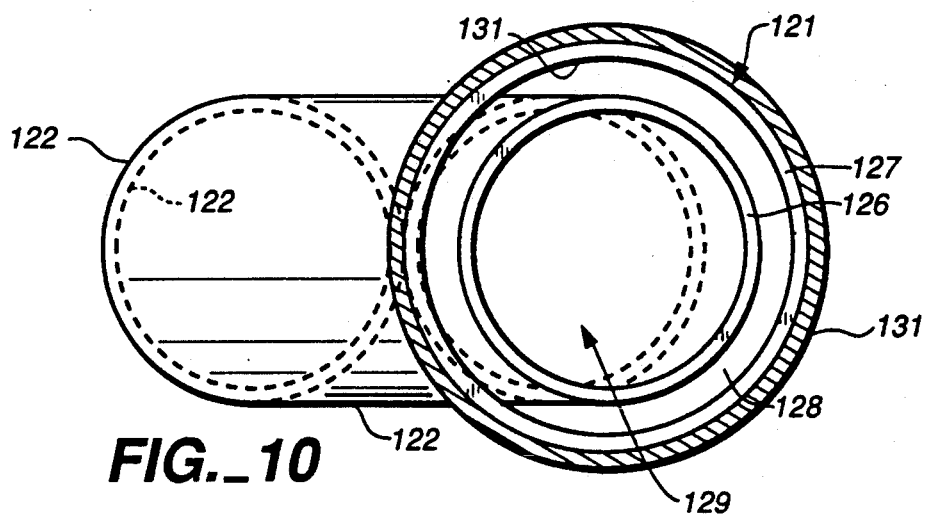
FIG._10

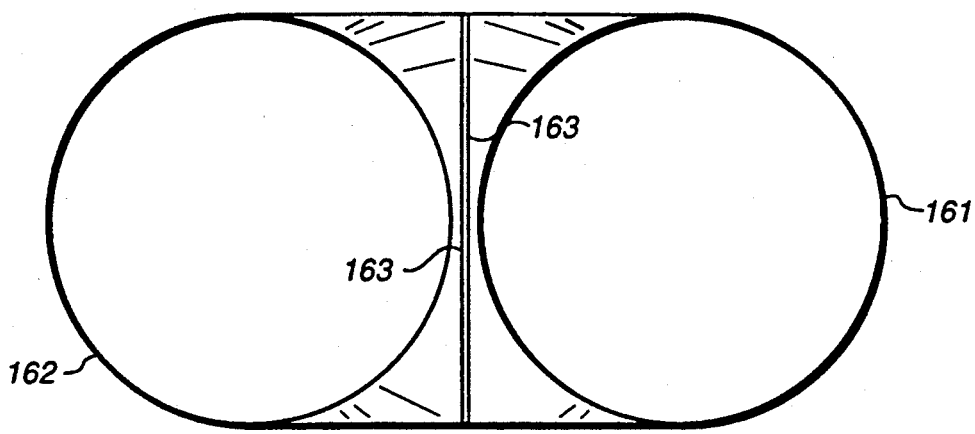
FIG._11
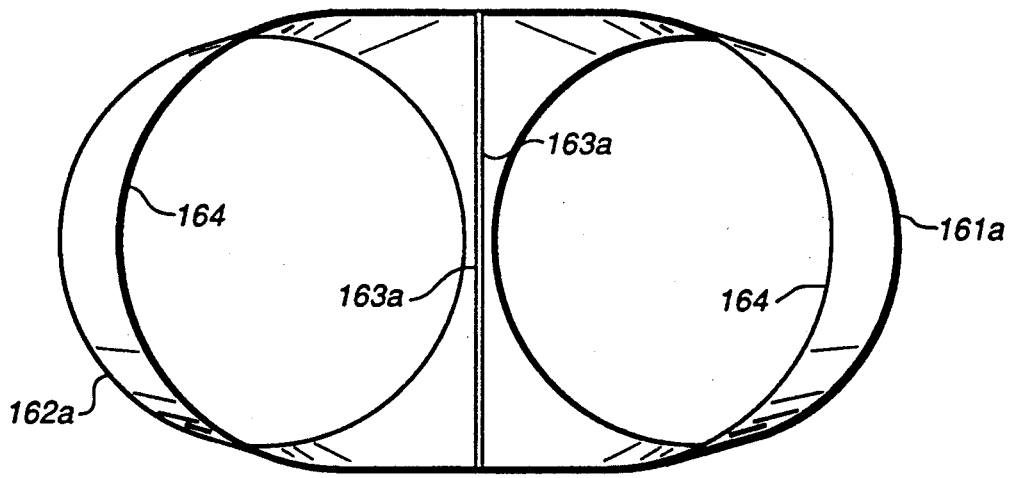
FIG._12
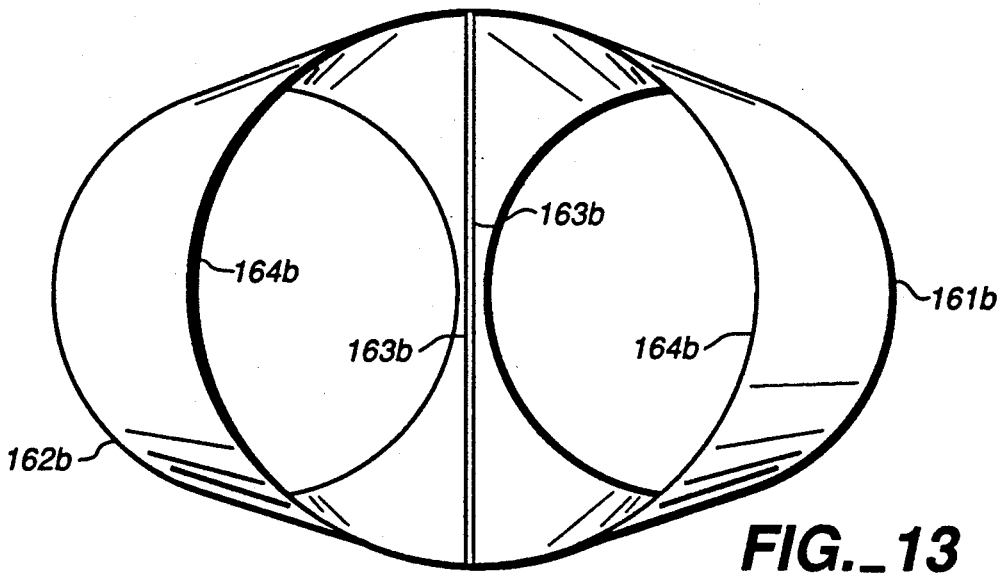
FIG._13

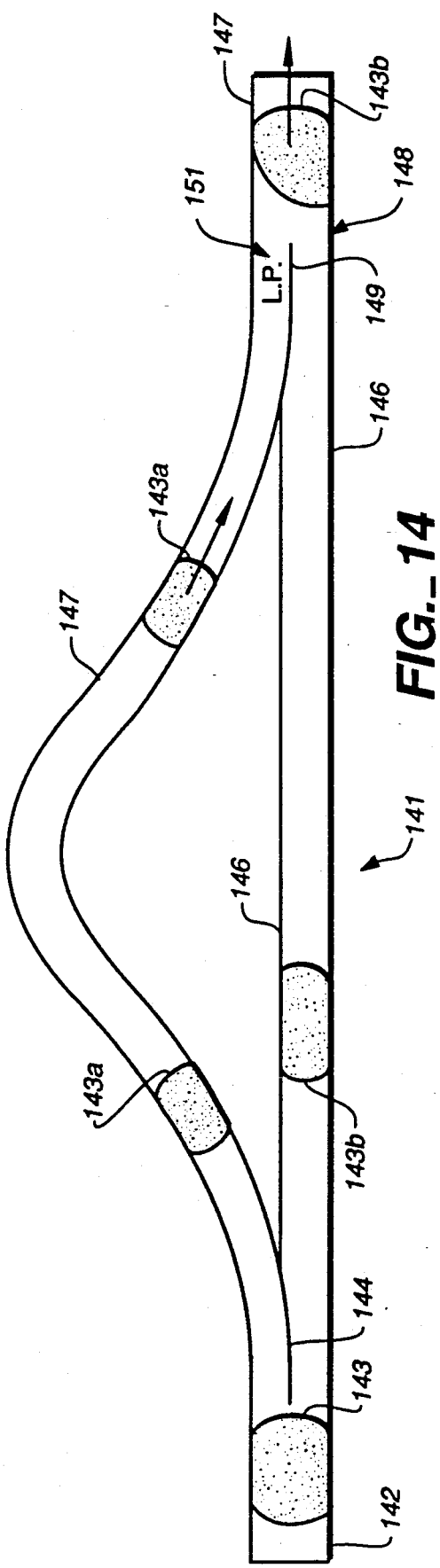
FIG._14
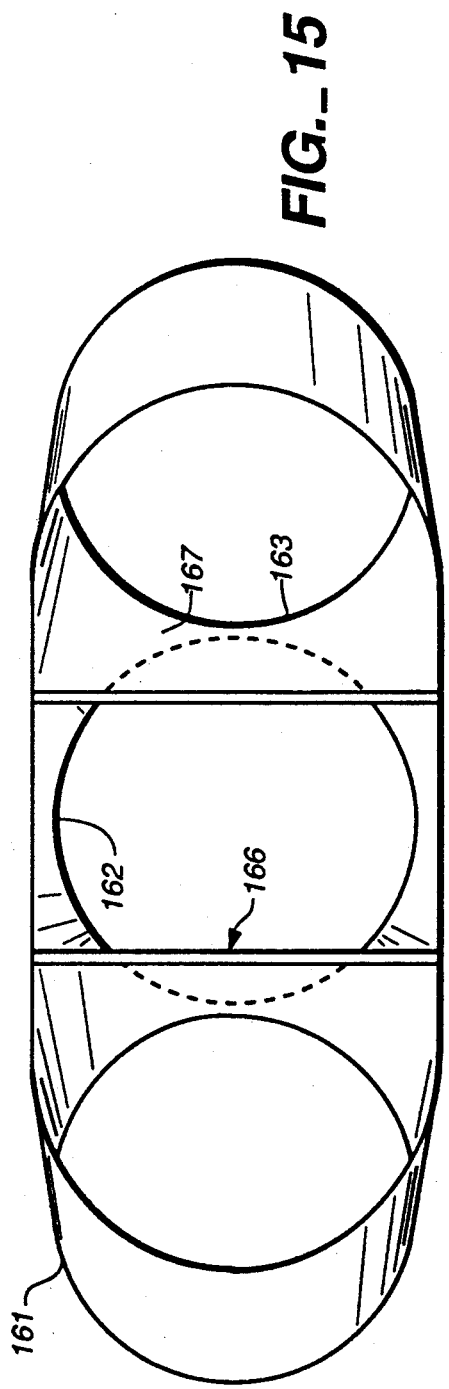
FIG._15

HEADER ASSEMBLY FOR INTERNAL COMBUSTION ENGINE AND METHOD

This is a continuation of application Ser. No. 07/566,983 filed Aug. 13, 1990, abandoned.

TECHNICAL FIELD

The present invention relates, in general, to exhaust systems for internal combustion engines, and more particularly, relates to header assemblies of the type frequently used on high-performance engines such as are used in racing cars or the like.

BACKGROUND ART

Exhaust systems for high-performance internal combustion engines of the type used on racing cars have been the subject of considerable empirical design work and some theoretical studies. Nevertheless, exhaust systems are often treated somewhat as stepchildren by racing teams in the effort to increase engine performance. They generally are regarded as necessary evils which can contribute only relatively insignificantly to increase, and more conventionally are thought to decrease, engine horsepower.

To the extent that theoretical-based attempts have been made to enhance engine performance through optimization of exhaust system design, most of this effort has been directed toward what is called "ram tuning" of the exhaust header pipes. Ram tuning is based upon the concept that both the intake and exhaust in internal combustion engines take the form of compressed gas volumes, masses or pulses. The exhaust pulses are controlled by opening and closing of the exhaust valve, and if the length of the exhaust pipe is properly selected, tuned, a negative pressure wave can be timed to be present at the exhaust valve when it opens so as to aid or assist the exhaust of consumed gases from the cylinder. Ram tuning of intakes and exhausts is discussed at length, for example, in *Cycle World*, "Intake and Exhaust Ram Tuning" by Gordon H. Jennings (1962), and will not be repeated in this application.

While ram tuning of exhaust header pipes is possible and advantageous, as a practical matter it is extremely difficult to obtain significant horsepower improvement using this technique. Ram tuning horsepower increases occur only at very precise, and often unpredictable, engine speeds. Moreover, using ram tuning in a four cycle racing engine, you may be able to achieve a horsepower increase of, for example, five horsepower at 6000 rpm in a 450 horsepower engine. At 5900 or 6100 rpm, however, the ram tuning horsepower increase is zero. Nevertheless, the "conventional wisdom" is to attempt to select header pipe lengths so as to achieve ram tuning and horsepower enhancement at some desired engine speed, depending upon the operating and racing parameters.

One of the problems of trying to predict the speed at which ram tuning will occur is that the speed of sound varies with the temperature of the media in which it travels to a significant degree. Additionally, exhaust pipes are not filled with a homogeneous density or pressure of gas. Thus, ram tuning calculations usually are based upon a plurality of assumptions or approximations which seldom, if ever, correlate with the reality of conditions inside an exhaust header pipe. Precise measurement of the exhaust temperature as it exits the engine is seldom available, and this temperature changes dramatically down the length of the pipe. Exhaust system designers, therefore, often theoretically predict pipe length, install the same and then proceed to try to adjust the pipe length until some effect on engine horsepower can be observed.

Another disadvantage in connection with ram tuning is that the length of header pipes must be precise and matched to have any significant effect. The matching and precision in length can pose serious design problems when coupled with the requirements for the racing car chassis. Thus, ram tuning can produce header pipe designs which are not easily accommodated by racing car chassis. The result can be to disregard ram tuning of the exhaust system or to compromise chassis design.

Another approach to exhaust system design has been to employ header assemblies which have collectors that first allow exhaust gas expansion and then converge the gases to increase velocity and attempt to affect engine horsepower. Typical of these header assembly systems are the so called "tri-Y" header collector and the "clover leaf" header collector. FIGS. 1 and 1A of the accompanying drawing show a tri-Y header collector mounted on two header pipes, and FIGS. 2 and 2A illustrate a clover leaf collector mounted on four header pipes.

In FIGS. 1 and 1A, a pair of header pipes 21 and 22 are connected at one end to the exhaust ports of two engine cylinders (not shown). At the other end, a tri-Y collector, generally designated 23, is welded at 24 in a bead around each of the header pipes. Collector 23 is swaged at 26 to substantially conform to the pipes, with a welding at 25 filling the arcuate interstices between the collector and the pipes. Collector 23 has a frusto-conical section 27 which extends to a cylindrical section 28. Mounted on the end of cylindrical section 28 is a further exhaust pipe (not shown), which can be coupled to another header pipe or to a muffler. As will be seen FIG. 1, the swaged indentation 26 extends into frusto-conical portion 27 of collector 23.

It has been found that tri-Y header collectors can be effective in some cases to increase engine horsepower. Collector design, however, largely has focused on the relative sizes of the areas of pipes 21 and 22 and the area of cylindrical collector portion 28 (and to some degree the rate of taper of frusto-conical portion 27). Usually, the area of cylindrical portion 28 of a tri-Y collector will be at least 30 percent less than the combined areas of pipes 21 and 22.

What has been discovered in connection with tri-Y header designs, however, is that increases in lower rpm horsepower can be achieved, but they occur at the expense of a reduction in the high rpm horsepower. Moreover, the increases which can be obtained at the lower rpm are often only 10 horsepower, while at the same time 40 horsepower will be lost at high rpm. Still further, it often is not possible to predict where a tri-Y header will increase horsepower, making it necessary to design collectors empirically for each racing engine.

It will be appreciated that compressed exhaust gas volumes or masses will alternate or be out-of-phase in their discharge from the ends of pipes 21 and 22 by a spacing determined by opening of the respective exhaust valves on the cylinders to which the header pipes are coupled. As engine speed, rpm, increases the spacing between exhaust volumes in the same pipe and in alternate pipes decreases. Thus, the velocity increase produced by tapered collector portion 27 is effective to increase horsepower at low rpm because the exhaust volumes spacing has not become critical. As the engine speed increases, however, the thirty-plus reduction in the combined area produced by tapered section 27 begins to act as a restriction or chock and engine top-end horsepower is decreased.

In the clover leaf header collector of FIGS. 2 and 2A, four primary header pipes 31, 32, 33 and 34 are joined by a clover leaf collector, generally designated 36. Pipes 31-34 are held in side-by-side relation and a diamond shaped end plate 37 is welded to 38 to fill the space between the pipes. Collector housing 36 is swaged at 39 to conform to the exterior of the pipes and then is welded at 41 all the way around the pipes. The collector similarly is frusto-conical at 42 and tapers to a cylindrical section 43 having an area at least 30 percent less than the combined areas of pipes 31-34. As also will be seen from FIG. 1, swaged indentations 39 extend along tapered section 43, and in fact extend into the tapered sections on four sides of collector 36.

Again, however, the primary mechanism for horsepower increase in clover leaf collectors is the discharge of gases into an expansion funnel 43, which thereafter contacts them to increase velocity. Because of the large volume of cloverleaf collector, the horsepower increase does not occur until the top-end of engine speed and there is a bottom end loss. Thus, one might obtain 5 to 10 horsepower increase at high rpms and lose as much as 50 horsepower at low rpms.

With six cylinder engines header collectors can be used to collect exhaust gases from a triangular array of three header pipes. The function and effect is substantially the same as above described in connection with clover leaf and tri-Y collectors.

A third largely empirical exhaust system design tool is the "balance pipe". In any exhaust pipe the sound components will tend to periodically reinforce and cancel each other at locations along the exhaust pipe determined by sound frequencies, pipe temperatures and pipe configuration. These areas of sound reinforcement, heat is generated and the exhaust pipe acts as though it has a restriction in it. This effect can be overcome by expansion regions or by a balance pipe which couples one of a pair of exhaust pipes to the other of the pair at the position along the pipes at which sound reinforcement is occurring.

Balance pipes generally do increase engine horsepower, and also they may remove the sound-induced restriction which would be present in the exhaust system if the balance pipe were not added. The addition of a balance, however, essentially recaptures horsepower loss that would otherwise occur. Again, however, the location of balance pipes is largely empirically determined, for example, by thermal sensing of hot spots along a pipe (sometimes as much as 200° F. hotter).

The net result of considering these various exhaust system header design criteria, however, has been that "conventional wisdom" usually leads the designer to limited horsepower improvements for limited engine speed ranges, largely through empirical testing. Internal combustion engine exhaust system design, therefore, has been somewhat unpredictable and often only of marginal impact on engine performance.

Accordingly, it is an object of the present invention to provide an exhaust system header assembly for an internal combustion engine which is designed in a manner which measurably increases engine horsepower at substantially all normal engine operating speeds.

Another object of the present invention is to provide a header assembly and method for enhancing engine horsepower which can be predictably employed to significantly enhance engine horsepower at specific engine speeds.

Still another object of the present invention is to provide a header assembly and method of enhancing engine horsepower which produces horsepower increases substantially in excess of the horsepower increases which can be achieved through ram tuning.

Still a further object of the present invention is to provide an internal combustion engine header assembly and method for increasing engine horsepower which is not sensitive to the length of header pipes and thereby provides increased flexibility of header and chassis design.

Still another object of the present invention is to provide a header assembly and method which can be used in combination with low-pressure generating mufflers to greatly enhance engine horsepower.

Another object of the present invention is to provide an internal combustion engine header assembly which is easy and inexpensive to construct, durable, can be retrofit onto virtually any engine, is suitable for use with engines of any number of cylinders, and requires less empirical adjustment to achieve significant horsepower increases.

The header assembly and method of the present invention have other objects and features of advantage which will become apparent from, or are set forth in more detail in, the accompanying drawing and following description of the best mode carrying out the invention.

DISCLOSURE OF INVENTION

The internal combustion engine header assembly of the present invention includes a pair of header pipes each having discharge ends, and a collector having a housing with an inlet opening mounted on the ends of the header pipes and a housing directing the exhaust gases discharged from the header pipes to a collector outlet opening. The improvement in the header assembly of the present invention is comprised, briefly of the collector and header pipes cooperating to produce flow of exhaust gas in the collector housing in a manner fluid coupling each of the pipes to the other by an amount sufficient to measurably increase the horsepower of the internal combustion engine at substantially all normal engine operating speeds. Most preferably, the collector is formed so that compressed exhaust gas mass or volume discharged from one of the pipes into the collector housing is substantially unrestricted for lateral expansion of the exhaust mass or volume across the discharge end of the other of the pipes to produce a low-pressure region in the other pipe in advance of an on-coming phase-delayed exhaust mass or volume. Moreover, the pipes preferably discharge along a common interface or boundary of substantial transverse length dimension to enhance fluid coupling.

The method of increasing engine horsepower in an internal combustion engine of the present invention is comprised, briefly, of the steps of fluid coupling together exhaust gases from at least two header pipes sufficiently that exhaust pulses from one pipe induce a low-pressure region in the other pipe and exhaust masses or volumes in the other pipe to induce a low-pressure region in the first named pipe. Thus, the method preferably is accomplished by causing fluid to flow along a common interface or boundary with sufficient transverse length and no channeling to produce scavenging of one pipe by the other and vice versa.

BRIEF DESCRIPTION OF THE DRAWING

FIG. 1 is a fragmentary, top plan view in cross-section, of a tri-Y header pipe and collector assembly constructed in a manner known in the prior art.

FIG. 1A is a cross-sectional view taken substantially along the plane of line 1A—1A in FIG. 1 and showing the collector discharge pipe in phantom.

FIG. 2 is a fragmentary, top plan view, in cross section, taken substantially along the plane of line 2—2 in FIG. 2A, of a clover leaf header collector assembly constructed in a manner known in the prior art.

FIG. 2A is a cross-sectional view taken substantially along the plane of line 2A—2A in FIG. 2 and showing the collector discharge pipe in phantom.

FIG. 3 is a top plan, schematic view of the header assembly of the present invention mounted to an eight cylinder internal combustion engine and having a low-pressure generating muffler attached thereto.

FIG. 4 is an enlarged, fragmentary, top plan view, partially broken away, of the area of the header assembly bounded by line 4—4 in FIG. 3.

FIG. 5 is an enlarged, fragmentary, side elevation view, partially broken away, of the portion of the header assembly shown in FIG. 4.

FIG. 6 is an enlarged, end view in cross-section of the header assembly taken substantially along the plane of line 6—6 in FIG. 4 and showing the collector discharge pipes in phantom.

FIG. 7 is an enlarged, end elevation view, taken substantially along the plane of line 7—7 in FIG. 4, and showing the collector discharge pipe in phantom and omitting the showing of the in-coming pipes of FIG. 6.

FIG. 8 is an enlarged, end elevation view, taken substantially along the plane of line 8—8 in FIG. 4, and showing the in-coming pipes of both FIGS. 6 and 7.

FIG. 9 is an enlarged fragmentary, top plan view, in cross-section, of an alternative embodiment of a header assembly of the present invention.

FIG. 10 is an end elevation view taken substantially along the plane of line 10—10 in FIG. 9.

FIG. 11 is a schematic, end elevation view of header pipes suitable for use in the header assembly of the present invention.

FIG. 12 is a schematic, end elevation view, corresponding to FIG. 11, of an alternative form of the header pipes.

FIG. 13 is a schematic, end elevation view, corresponding to FIG. 11, of still a further alternative design for the header pipes of the present invention.

FIG. 14 is a top plan schematic representation of still a further alternative embodiment of the header assembly of the present invention.

FIG. 15 is a schematic, end elevation view, corresponding to FIG. 11 of an embodiment of the header assembly suitable for use with a six cylinder engine.

BEST MODE OF CARRYING OUT THE INVENTION

The exhaust header assembly of the present invention is not based upon the convergence or contraction of exhaust gases in a funnel-like header collector to effect horsepower increase. In fact, the substantial horsepower increases achieved using the header assembly of the present invention are accomplished by a collector which preferably has a collector discharge area which is not more than ten percent less than the combined areas of the header pipes.

It is believed that the primary reason why prior art tri-y and cloverleaf header systems have been relatively ineffective in increasing engine horsepower is that the only effect being employed to increase horsepower is the exhaust gas velocity buildup effect of the tapered section of the collector. This velocity increase, however, acts as a choke or a restriction on horsepower as engine speed increases. Inherently, therefore, such prior art headers have very limited horsepower enhancement effects.

The header assembly of the present invention employs a fundamentally different effect in increasing engine horsepower, as compared to tri-y and cloverleaf headers. Instead of trying to accelerate the gases by expanding the gases and then reducing the area significantly in the collector, the header collector of the present invention is designed to employ substantial and significant fluid coupling or scavenging of one header pipe by the other. It is believed that in prior art headers there is no significant fluid coupling or Venturi effect of one header pipe on the other.

As may be seen for the prior art shown in FIGS. 1 and 2, a compressed exhaust gas volume or mass, schematically shown as a discrete volume bounded by line 29 in FIG. 1 and line 44 in FIG. 2, is discharged from the lower header pipes 22 and 32, respectively, and remains relatively channeled or confined by the inwardly projecting ribs 26 and 39 of the tapering sections of the collector. Thus the upper edges 30 and 45 of masses or volumes 29 and 44 are slow to expand laterally and slow to fill the entire diameter of tapered sections 27 and 42 of the collectors. The forward motion of volumes 29 and 44, as indicated by arrows 20 and 46, therefore, does not tend to create a low pressure region or volume behind the exhaust volume.

As also may be seen in FIGS. 1A and 2A, one header pipe is merely in tangential, or relative point contact, with the other header pipe. The transverse length dimension, T.L., of contact between an exhaust pulse discharged from one pipe into the collector with the stationary or slow moving gases in the other pipe is accordingly relatively low. Thus, fluid coupling in both the tri-y and cloverleaf header assemblies is believed to be essentially insignificant.

It also will be noted in connection with the cloverleaf collector of FIGS. 2 and 2A that each volume 44 that is discharged into tapered collector portion 42 is "seen" by the remaining three header pipes. This substantially increases the pipe volume into which exhaust volume 44 is discharged and reduces further any chance of a scavenging or Venturi effect of one pipe on the other.

It is interesting to note that tri-y headers are somewhat more effective at increasing horsepower on the low end of engine speed than cloverleaf collectors, but tri-y collectors cause more horsepower loss on the high end. The added pipe volume in the cloverleaf deflector, because there are three tubes exposed to each exhaust volume, may account for less restriction or choking at high engine speeds and according less horsepower loss.

Inherently, therefore, prior art header collector assemblies have had two structural features which have essentially eliminated the possibility of significant fluid coupling between the header pipes. First, they tend to have channels in the tapering collector section which limit and confine exhaust volume expansion. Second, they have very small transverse contact or boundaries with the adjacent header tubes. The result has been poor, if any, fluid coupling between header tubes.

By contrast, the header assembly of the present invention employs substantial fluid coupling to measurably increase engine horsepower across substantially all usable engine operating speeds. Moreover, such fluid coupling is capable of horsepower increases on the order of five times that which can be achieved at narrow speedbands using ram tuning. Still further, the use of a header assembly which employs fluid coupling to increase engine horsepower can obtain horsepower increases at the top end of engine speed, as well as proportionally down to the low end of engine speed.

Referring now to FIGS. 3 and 4, the header assembly of the present invention, which achieves these results, can be described in detail. An internal combustion engine, generally designated 51, is here schematically shown as a V-8 engine having engine cylinders 52, exhaust valves 53 and intake valves 54. There are various cylinder numbering and sequencing schemes, but typical of these schemes is the one employed by Chevrolet in which the cylinders on one side of the engine are given the odd numbers, namely, 1, 3, 5 and 7, and the cylinders on the other side are given even numbers, namely, 2, 4, 6 and 8. Using this notation the firing order of the cylinders typically would be 1-8-47-3-6-5-7-2. The cylinder phasing is by 90°, keeping in mind the engine is a four cycle engine which would require one camshaft rotation to complete the cylinder firing sequence.

Mounted to exhaust ports on engine 51 are a plurality of primary header pipes 56, 57, 58 and 59. A similar set of primary header pipes 56a–59a is mounted to the other side of engine 51. The coupling of header pipes to engine 51 is conventional and does not form a part of the present invention.

The discharge ends of header pipes 56–59 and 56a–59a are coupled to four primary collector assemblies, generally designated 61, 62, 63 and 64. The primary header pipes are coupled to primary collector assemblies 61–64 in pairs. Thus, as best may be seen in FIGS. 4 and 5, the discharge ends 66 and 67 of primary header pipes 56 and 59 are mounted in inlet means or openings 68 of primary header collector 61. Similarly, the ends of pipes 57 and 58 are mounted in the inlet opening of primary header collector 62.

As is apparent from FIG. 6, the array of primary header pipes is similar to the conventional cloverleaf array of FIG. 2A, and it is a feature of the present invention that the header assembly of the present invention can be used on a conventional 4-pipe header array. More particularly, the array of the present invention can be retro-fit to a cloverleaf array by simply cutting off the old headers just before the collectors and, reforming the ends of the discharge tubes, and adding the collectors of the present invention.

Unlike the cloverleaf collector 36 of FIGS. 2 and 2A, however, in the present invention, it is preferable that not more than two header pipes be coupled together by a single collector. In FIG. 6, therefore, it will be seen that two primary header collectors 61 and 62 are used instead of a single cloverleaf collector 36. The reason for coupling header pipes together in pairs is that better fluid coupling or scavenging effects can be accomplished when each header pipe is coupled to scavenge only one other pipe.

Another very significant difference in the header pipe assembly of the present invention, as compared to the prior art, which can be seen in FIG. 6, is that there is a common interface or boundary, here a plane 71 which has a transverse length dimension, T.L., that is substantial, preferably about equal to the diameter of the incoming header pipes. Compared to the common transverse length, T.L., in FIGS. 1A and 2A, it will be seen that planes 71 which provide a common boundary between pipes 56 and 59, and between pipes 57 and 58, are much longer in length.

The provision of a common interface boundary between adjacent cylindrical header pipes is accomplished by swaging the pipe ends at 72 to deform walls 73 outwardly until they can be placed in back-to-back abutting relationship. Such swaging usually takes place over a length of the discharge ends of the pipes equal to at least about one tube diameter. Thus, as may be seen in FIG. 4, lengths 74 of the primary header tubes have been swaged, as shown in FIG. 6, so as to cause the inner end walls 73 to be outwardly displaced for positioning in back-to-back relationship.

Once header pipe ends are swaged, they can be welded, for example at 76, together and thereafter ground, if necessary, to provide a smooth, relatively thin common wall for discharge of exhaust gas masses or volumes from each header pipe substantially along plane 71. As illustrated in FIG. 6, only the top portion of tubes 56 and 59 are shown welded together at 76, but it will be understood that in the preferred manufacturing form the entire interface along plane 71 will normally be welded together. It should be noted, however, that other methods of securement of the header pipes together can be used, and it is not essential that the two pipes be fastened together, only that there be a common boundary 71 of substantial transverse length relative to the smallest of the header tube diameters so as to produce a significant degree of fluid coupling between the side-by-side tubes, as will be described in detail hereinafter.

Another significant difference in the header assembly of the present invention, as compared to the prior art, can be seen in FIG. 5. As is apparent, the tapered portion 77 has an interior frusto-conical surface 78 that is free of indentations or ribbing. Thus, the collector cone or funnel 77 does not constrain or confine exhaust gas masses or volumes in channels which effectively extend the header pipes. Instead, smooth frusto-conical surface 78 will permit lateral expansion of the exhaust mass or volumes as it travels down the tapered collector section 77.

Finally, in collectors 61–64, the cylindrical downstream collector section 79, which in effect acts as a secondary header pipe, has an area which is substantially equal to, or preferably is only slightly smaller than, the combined areas of the primary header pipes. In the most preferred form, the internal diameter of cylindrical section or secondary header pipe 79 is about 10% less than the combined area of internal diameters of primary header pipes 56 and 59. It will be appreciated, however, that exhaust volumes reach collectors 61–64 in an alternating or out-of-phase relationship. At any time, therefore, there would normally be only one volume entering the frusto-conical collector section 77. The area of the frusto-conical collector section 77, and that of the cylindrical section 79, are both almost twice that of the area from which the volume is discharged. Accordingly, there is significant expansion of the exhaust volume when it reaches conical section 77. The conical section causes convergence and a velocity increase of the volume, but far less convergence and increased velocity than in prior art collectors, which reduce the area by 30 percent or more. Moreover, it will seen from alternative embodiments discussed hereinafter that the header collector of the present invention need not have any convergence in order to achieve horsepower increases.

As used herein, "primary," "secondary," "tertiary" and "quaternary" refer to the header pipes in advance of the various collectors, starting with the primary header pipes which are mounted to the engine exhaust ports. In some cases the cylindrical portion, such as section 79, acts as an integral portion of the collector and as a secondary header pipe which discharges into a secondary collector. The collector identification, therefore, is based upon the pipes discharging into the collector. Thus, the tertiary header pipes discharge into the tertiary collector.

In the preferred form of the present invention, tapered portion 77 of the collector will have a length of about 1½ to about 3½ header pipe diameters, with more gradual tapers being favored. More importantly, the length of cylindrical section 79 can be used to tune the engine speed at which maximum horsepower increase will be achieved. As the length of section or secondary header pipe 79 is increased, the maximum increase in horsepower produced by the header assembly of the present invention tends to occur at lower engine operating speeds. Thus, for short collector cylindrical sections 79 maximum horsepower increases will be experienced toward the top end of the speed range, while for longer cylindrical sections, the maximum horsepower increase will be achieved at lower rpm. In both cases, however, horsepower increases will be achieved over substantially the entire engine operating speed. Thus, if it is desired to boost horsepower at 4000 rpm by increasing the length of section 79, the increase at 4000 rpm will not be accompanied by a decreased engine horsepower at 8000 rpm.

It would be possible for the four secondary header sections 79 from primary collectors 61-64 to discharge to atmosphere or to be coupled through exhaust pipes to mufflers. In the illustrated and preferred form of the header assembly for V-8 engines, discharge pipes 79, 79a, 79b and 79c are joined together in pairs in two secondary header collector assemblies 81 and 82. As was the case in connection with the primary header pipes, secondary header pipes 79 and 79a are preferably deformed over a length 83 (FIGS. 4 and 5) so as to include walls 84 which can be positioned in back-to-back relationship along common plane 86 having a significant transverse length, T.L. Moreover, collector tapered portion 87 is again formed with a smooth frusto-conical inner surface 88. The frusto-conical surface tapers to a cylindrical section or tertiary pipe 89 which has an area about equal to, or only slightly less than, the combined area of secondary pipes 79 and 79a.

In the present invention, therefore, at least one of the collector and header pipes is formed to effect fluid coupling. Most preferably both the pipes and the collector are cooperatively formed. Thus, the pipes have a D-shaped cross-section upstream of the collector and the collector is rib or protrusion free for maximum scavenging effect.

Using the primary and secondary collector assemblies as thus far described, very significant horsepower increases have been achieved in racing engines that have been tuned by experts. In a Chevrolet V-8 engine developing 585 horsepower at about 8200 rpm, replacement of a standard cloverleaf header assembly by the header assembly of the present invention resulted in a horsepower increase at 8200 rpm of 29 horsepower. Thus, after the best tuning, replacing the existing header assembly with the header assembly of the present invention resulted in a top-end horsepower increase of almost 5%. This increase, by comparison, is on the order of five times the maximum increase which can be achieved at limited engine speed bands through ram tuning. Moreover and very importantly, at 5000 rpm an increase of 33 horsepower was achieved.

While the schematic representation of exhaust masses or volumes in FIG. 4 may not be precisely accurate, they enable an analysis of what is believed to be the principle behind the across-the-board horsepower increases which have been obtained using the header assembly of the present invention. As will be seen in FIG. 4, an exhaust mass 91, shown in broken lines in secondary header pipe 79, is discharged from the end 92 of the pipe into frusto-conical portion 87 of secondary collector 81. As mass 91 enters frusto-conical collector portion 87, it does so along a boundary 86 having a substantial transverse length with the other header pipe 79a. Moreover, since frusto-conical inner surface 88 is free of ribs and protrusions, exhaust volume 91 can expand from the broken line position in FIG. 4 toward a solid line position in which the exhaust volume substantially fills the collector diameter. As the exhaust volume moves forward, as indicated by arrow 93, due to its forward momentum, a slight decrease in the pressure behind mass or volume 91 begins to occur in both the header tubes, and particularly in the region or volume in header tube 79a in advance of exhaust volume 94. Volume or mass 94 is traveling down the primary collector 62, as indicated by arrow 96, out-of-phase with volume 91. Also, during the movement of volume 91 from tube 79 into frusto-conical collector end 87, the substantial transverse length, T.L., of the common interface with tube 79a causes the exhaust volume upper surface 97 to pull or engage and intermingle with low-speed or relatively stationary gases along interface plane 86. The rapid movement of volume 91 into the collector, therefore, together with its expansion and initial substantial area of contact with gases in tube 97a, result in a pulling of gases from tube or pipe 79a lowering of the pressure in advance of the exhaust volume 94, which is downstream or out-of-phase with volume 91.

The velocity of advance of out-of-phase volume 94 in pipe 79a is now accelerated slightly by the low pressure, L.P., in region 98 in advance of volume 94. The low pressure region 98 in turn causes a slight acceleration of volume 94, which lowers the pressure in region 99 behind volume 94. This process continues upstream to the exhaust valve 53 to which the primary header 58 is coupled.

In turn, when exhaust volume 94 enters secondary collector 81, it will expand in a reverse direction toward the opposite wall as it moves forward in the collector, and it will have contact along a common plane of substantial length 86 so as to pull or lower the pressure in front of the next or out-of-phase volume in secondary header pipe 79. This produces low pressure which is communicated back up the exhaust system to the exhaust valve to which header 59 is coupled.

This fluid coupling or Venturi effect, which is communicated back up to the exhaust valves 53 of engine 51, is much more effective in increasing horsepower than the ram tuning effect. Nevertheless, the general concept is broadly the same in that the low pressure, L.P., present at exhaust valves 53 will enable the same volume of exhaust gases to be pulled from cylinder 52 in a shorter period of time. This allows the timing of opening and closing of the exhaust valves to be shortened, which in turn permits the generation of additional horsepower. The low pressure effect from fluid coupling, however, is much greater than can be achieved through ram tuning. Accordingly, the horsepower increase is much more substantial, and it will be apparent that the horsepower increase will occur at every speed because there are out-of-phase or alternating exhaust pulses being discharged into the header collector assembly at every speed. Thus, the low pressure regions or Venturi-type scavenging of one exhaust pipe header by the other occurs at 2500 rpm, as well at 8000 rpm.

There is an effect in the present header assembly which is produced by changes in engine speed. As the engine speed increases, the spacing between volumes 91 and 94, for example, is reduced. When the engine slows, the spacing between volume increases. As the exhaust volume spacing increases too much, the effectiveness in scavenging and the resultant increase in horsepower will also drop off. Thus, the farther apart volume 94 and 91 are the less will be the effect at low engine speeds. As the engine speed increases, however, the same phase relationship between exhaust volumes will produce better scavenging and higher horsepower increases.

In the preferred form of the present invention, the cylinders are selected so that exhaust volumes are out-of-phase by about 90 degrees of cam rotation. Thus, the first and seventh cylinders are coupled together through collector 61 and are spaced at about 90 degrees from each other, while the third and fifth cylinders are similarly spaced. This spacing also is found on the other side of the engine block, and it produces sufficient out-of-phase spacing between the exhaust volumes to effect a significant degree of coupling or scavenging over most useful or normal engine ranges. It is possible, however, to simply rotate the primary header collector array by 90 degrees from that as shown in FIG. 6, which would couple together cylinders 1 and 3 in collector 62 and cylinders 5 and 7 in collector 61. This would result in the exhaust volumes being 135 degrees out-of-phase. Such an additional spacing would be particularly advantageous for scavenging at high engine speeds. Thus, a track which was set up primarily for high speed competition might prefer to use a coupling together of cylinders which increased the phase difference over a more standard and general purpose phase difference of 90 degrees.

In the broadest aspect of the present invention the gas volumes do not have to be out-of-phase. If the collector volume is large enough, two exhaust volumes can be discharged into the collector at the same time and, if there is a substantial common transverse length between them for good fluid coupling they will scavenge the volumes behind in both pipes to some degree. The effect, however, is not as strong as when alternating transverse volumes are discharged into a smaller collector.

As above noted, the length of cylindrical section 89 of the secondary collector assembly 81 can be varied in a manner which influences the engine speed at which maximum horsepower increase will occur. As shown in the figures, a tertiary header pipe 101 is welded at 102 to the cylindrical section 89, and a similar pipe 103 (FIG. 3) can be welded at 104 to the cylindrical section of secondary collector assembly 82. The tertiary header pipes 101 and 103 have the effect of tuning the maximum horsepower increase speed depending upon their length.

Assuming that it desirable from the design standpoint to have the maximum horsepower increase occur at 7000 rpm, the length of tertiary header pipes 101 and 103 which would ideally produce maximum horsepower at 7000 rpm might be at position or length 106. If the racing car permitted, the muffler would be attached at point 106 for each of pipes 101 and 103. In many instances, however, the attachment of a muffler at precisely the ideal location for maximizing horsepower at a given speed will be impossible because of chassis or other restrictions. Instead, what can be done is to mount a balance pipe 107 (FIG. 3) which communicates between pipes 101 and 103 and thereby effectively maintains the maximum horsepower increase at about the desired engine speed. The balance pipe also has the effects of reducing heat build-up and sound attenuation.

In the most preferred form of the exhaust system of the present invention, tertiary header pipes 101 and 103 are brought together into a tertiary collector assembly 111 (FIG. 3). Again, the tapered portion 112 of the tertiary collector is formed so as to be channel-free, and tertiary header pipes 101 and 103 are configured at the ends 113 and 114 so as to have a common transverse discharge interface above substantial length producing a high degree of fluid coupling between pipes 101 and 103.

Tertiary header collector assembly 111 is coupled to a quartenary header pipe 116 which in turn has muffler 117 mounted thereon. Again, the length of the cylindrical section 115 of the tertiary collector and pipe 116 can be selected to affect the engine speed at which maximum horsepower increase is achieved.

It is a further important feature of the present invention that the exhaust system include a muffler 117 which is formed to generate a low pressure region 118, inside the muffler which will be communicated back up through the header assembly to engine 51. The most preferred form of muffler for use with the header assembly of the present invention, therefore, is a muffler constructed as described in my U.S. Pat. No. 4,574,914. Even more preferably, the muffler structure of my co-pending U.S. patent application for Muffler Assembly with Perforated Partition for Ignition of Accumulated Fuel and Method is used in connection with the header assembly of the present invention. In both mufflers, a low pressure (L.P.) region 118 is generated by a diverging partition 119 and a subsequent converging partition 121. The details of construction of such mufflers will not be repeated herein. It has been found, however, that such low pressure-generating mufflers similarly increase engine horsepower.

The muffler of my U.S. Pat. No. 4,574,914, when combined with the header exhaust system above-described, acts as a check valve on the exhaust system which allows the low pressure generated in the muffler, and at the various points by the collector assemblies, to pull or scavenge in one direction only. Thus, the low pressure is communicated to exhaust valves 53, without periodic oscillation or high pressure waves moving back up through the muffler and collectors to the exhaust valves. It is this oscillation or periodic presence of positive waves which makes ram tuning unpredictable and even detrimental at some speeds. A low pressure generating muffler, such as muffler 117, when coupled to the exhaust header system will effect still further horsepower increase. Typically, the header system alone can increase engine horsepower for a 400 to 500 horsepower engine on the order of about 25 to 35 horsepower. Similarly, muffler 117 alone can increase top-end engine horsepower by about the same amount. When mounted together, horsepower increases of between 40 and 50 horsepower can be achieved at the high speed end of the engine operating range. As will be appreciated, a 50 horsepower increase in a racing engine output simply by changing the exhaust system is a very significant increase to the race car driver. FIGS. 9 and 10 illustrate an alternative embodiment of the header assembly of the present invention. As will be seen, two header pipes 121 and 122 are mounted in side-by-side relation, as is conventional. One of the pipes, namely pipe 121, includes an enlarged end 123 and is formed with an opening or port 124 in a side wall thereof. Extending through port 124 is header pipe 122, and the discharge end 126 can be seen to oriented concentrically with discharge end 127 of header pipe 123. The two discharge ends, therefore, define an annular area 128 for discharge of exhaust volumes or masses from header 121, which area preferably is about equal to the area of the central opening 129 of header pipe 122. The two concentric header pipes discharge exhaust volumes or masses into a collector tube 131 which can be cylindrical or slightly tapered.

It will be apparent that the header assembly of FIGS. 9 and 10 includes a concentric interface or boundary between the two tubes which has a very substantial length, in this case a common length equal to the circumference of inner tube 122. A volume or mass from inner tube 122, therefore, scavenges the outer annular area 128, while a volume or mass from outer tube 121 will scavenge the inner tube 122.

FIG. 14 illustrates still a further embodiment of a header assembly constructed in accordance with the present invention. The assembly FIG. 14 not only employs a non-tapering collector, but it is suitable for use on a single cylinder. A header pipe assembly, generally designated 141 is coupled at end 142 to the exhaust port of a single cylinder (not shown). An exhaust gas volume or mass 143 moving down pipe 141 encounters a stream splitter 144 which divides volume or mass 143 into two volumes preferably equal in size. Thus, the header pipe is split into two channels 146 and 147 which have the same cross-sectional area and a combined cross-sectional area equal to the cross-section of header pipe 141 in advance of splitter 144. As divided, exhaust volume portions 143a and 143b travel respective channels 146 and 147. The length of one of the channels is greater than that of the other. As is here illustrated, channel 147 is longer in length than channel 146, and it is also has somewhat more resistance by comparison. As a result, volume 143b reaches cylindrical collector assembly section 148 before volume 143a. This results in an out-of-phase relationship between the sub-volumes 143a and 143b. Collector 148 again preferably includes a common plane or boundary interface 149 so that the end of header pipe 146 discharges volume 143b along a common boundary of substantial transverse length with the end of pipe 147 to produce a low pressure, L.P., region 151 in header tube 147. This low pressure, in turn, scavenges or accelerates volume 143a in tube 147. When the volume 143a reaches collector 148, it in turn scavenges pipe 146 and accelerates a following sub-volume in header pipe 146. As used herein, therefore, the expression "a pair of header pipes" shall include two pipes split or divided from the same cylinder.

Using the header assembly of FIG. 14, a horsepower increase can be obtained by the scavenging or Venturi effect of the collector assembly for even a single cylinder. Thus, even a one cylinder engine can benefit from the header assembly of FIG. 14, or alternatively, multiple header pipes each attached to a cylinder of a multi-cylinder engine can be employed to increase engine horsepower. Again, it would be noted, that the horsepower increase is accomplished without the use of a frusto-conical collector.

FIGS. 11-13 schematically illustrate various forms of coupling together of header pipes by a collector which are suitable for use in the present invention. FIG. 11 is essentially the back-to-back D-shaped entry cross-section employed in the collector assemblies of FIGS. 1-8. This is the easiest form of collector assembly to fabricate since all that is required is that the ends of the side-by-side header pipes 161 and 162 have their adjacent walls 163 swaged out to form back-to-back planes, which will cause the gases to flow in good contact with the adjacent header pipe. The collector is merely an oblong funnel have a cylindrical end.

In FIG. 12, header pipes 161a and 162a have had their ends swaged in several directions. First, the walls 163a have been swaged together to form a common interface plane. Additionally, it will be seen that walls 163 have been swaged outward so that the diameter or transverse length of walls 163 is now greater than the diameters of pipes 161a and 162a in order to accommodate the movement of material, the pipe ends also have been swaged inwardly at 164. The result is that the discharge ends of pipes 161a and 162a again have back-to-back D-shapes which are oblong when combined, but the height of the D is now greater and the width has been reduced. Obviously, the collector mounted on the pipes of FIGS. 11 and 12 has to be correspondingly shaped.

The effect of moving from FIG. 11 to FIG. 12 is to produce better fluid coupling of one pipe to the other. Thus, the pipe assembly shown in FIG. 12 will generate somewhat greater horsepower than that of FIG. 11, but it will also be more difficult to form.

In FIG. 13, header pipes 161b and 162b have been swaged to further increase their common transverse boundary 163b and the opposite sides 164b have been swaged inwardly to accommodate the increased transverse length of planes or walls 163b. The result of this configuration is to effect even further scavenging and horsepower increase. The cross-section as shown in FIG. 13 is particularly well suited for use as the collector assembly 148 in the header of FIG. 14. One of the advantages of this form of the header assembly is that a cylindrical header pipe can easily be coupled to the ends of pipes 161b and 162b.

In FIG. 15 an embodiment of the header assembly of the present invention suitable for six cylinder engines is shown. Three primary header pipes 161, 162 and 163 are mounted in side-by-side relation. The end pipes 161 and 163 have been formed with D-shaped discharge ends and middle pipe 162 has had its end formed into a rectangular shape. There are, therefore, two common planar interfaces 166 and 167 so that pipes 161 and 162 are fluid coupled and pipes 162 and 163 are fluid coupled. The fluid coupling between pipes 161 and 163 will be very poor, and the collector (not shown in FIG. 15) would be oblong and have a larger than optimum volume as a result of joining three pipes.

While the collector/pipe assembly of FIG. 15 would result in a horsepower increase, the preferred header assembly for a six cylinder engine would still be to couple primary header pipes in pairs. Thus, two pipes from one side of the block, two pipes from the other side and one pipe from each side could be joined in three primary collectors. Since ram tuning is insignificant, the fact that the pair having one pipe from each side might have different lengths than each other or the other pairs is not significant.

As will be apparent from the discussion of the various forms of the header apparatus of the present invention, the method of increasing engine horsepower of the present invention is comprised of employing a header system which affects fluid coupling of one header pipe to another. Thus, the present method includes a step of fluid coupling together at least two header pipes. The method most preferably accomplished by discharging exhaust gas along a common interface or boundary of substantial transverse length. As used herein, a "substantial transverse length" shall mean a length at least equal to about one-half of the smallest of the two header pipes coupled together. Additionally, a method of the present invention is accomplished by permitting unconfined expansion of exhaust volumes across a discharge opening of an adjacent pipe while the exhaust volumes are moving away from that discharge opening. The result is to produce a scavenging or Venturi effect which generates a low pressure volume or region in the other header pipe.

Additionally, the method of the present invention includes coupling a low pressure generating muffler to a header pipe assembly formed to fluid couple pairs of pipes together. The method finally includes, in another aspect, the tuning of the engine speed at which maximum horsepower is generated by varying the length downstream of the collector to produce the desired horsepower maximization.

What is claimed is:

1. A header assembly for an internal combustion engine comprising:
    a pair of tubular header pipes each having an inlet end, a discharge end, and an unconstricted transverse cross sectional area over the length of said pipes;
    collector means mounted to said pipes and having a collector housing formed with a pair of inlet openings coupled for receipt of exhaust gases from the discharge ends of said pipes, said housing having an outlet spaced from said inlet openings by a partition-free interior volume a substantial length dimension;
    each of said inlet openings having a transverse cross sectional area substantially equal to said cross sectional area of each of said pipes, and said outlet opening having a transverse cross sectional area not substantially less than about ten percent smaller than the combined cross sectional areas of both of said pipes; and
    at least one said collector housing and said pipes being formed for and directing the discharge of exhaust gases from said pipes into a partition-free interior volume along opposite dies of a common interface boundary in said interior volume of substantial transverse length dimension.

2. The header assembly as defined in claim 1 wherein, said pipes proximate said inlet opening means are formed to discharge exhaust gases from each of said pipes into said housing along said common interface.

3. The header assembly as defined in claim 2 wherein, said pipes proximate said inlet opening means discharge exhaust gases into said housing in substantially parallel relation to said common interface.

4. The header assembly as defined in claim 2 wherein, said common interface is a transversely extending interface plane positioned between said pipes.

5. The header assembly as defined in claim 4 wherein, said interface plane has a transverse length dimension at least equal to about one-half of the diameter of the smallest of said pipes.

6. The header assembly as defined in claim 4 wherein, said interface plane has a transverse length dimension at least about equal to the diameter of a smallest of said pipes.

7. The header assembly as defined in claim 1 wherein, said pipes, over a length extending upstream from said inlet openings by at least an amount equal one diameter of a smallest of said pipes, have transverse cross sectional shape of said inlet openings.

8. The header assembly as defined in claim 1, and a secondary header pipe mounted to said outlet opening and extending away therefrom.

9. The header assembly as defined in claim 8, and two additional primary header pipes,
    an additional primary collector formed as defined for the first-named collector means and fluid coupling said two additional primary header pipes together,
    an additional secondary header pipes mounted in an outlet opening of said additional primary collector, and
    a secondary collector formed as defined for the first-named collector means as fluid coupling said secondary header pipe and said additional secondary header pipe together.

10. The header assembly as defined in claim 9, and a tertiary header pipe extending from an outlet opening in said secondary collector.

11. The header assembly as defined in claim 9, and four additional primary header pipes,
    two additional primary collectors each formed as defined for said first-named collector means and each coupling a pair of primary header pipes together,
    two additional secondary header pipes each mounted to extend from the outlet openings in said two additional primary collectors,
    one additional secondary collector formed as defined for said first-named collector means and coupling said two additional secondary header pipes together, and
    an additional tertiary header pipe mounted to extend from the outlet opening of said additional secondary collector means.

12. The header assembly as defined in claim 11, and a low-pressure generating muffler mounted on said additional tertiary header pipe.

13. The header assembly as defined in claim 11, and a tertiary collector formed as defined for said first-named collector means and coupling said tertiary header pipe and said additional tertiary header pipe together, a quaternary header pipe mounted in the outlet opening of said tertiary collector, and a muffler mounted on said quaternary header pipe.

14. The header assembly as defined in claim 1, and exhaust pipe means mounted in said outlet opening of said collector means, and muffler means mounted to said exhaust pipe means.

15. A header assembly as defined in claim 1 wherein, each of the discharge ends has a common transverse length dimension about equal to the diameter of a smallest of said pipes.

16. A header assembly as defined in claim 15 wherein, said discharge ends each have substantially D-shaped cross sections with said D-shaped cross sections in back-to-back relation.

17. A collector assembly for mounting to a pair of header pipes having substantially a constant cross sectional area proximate discharge ends of said header pipes, the collector assembly comprising:

a collector housing formed with a pair of inlet openings dimensioned for connection to receive exhaust gases from said discharge ends of said header pipes and each having a transverse cross sectional area substantially equal to said constant cross sectional area of each of said header pipes, said collector housing being formed with an outlet opening positioned in generally opposed relation to said inlet openings and having a transverse cross sectional area at least equal to about ninety percent of the combined cross sectional area of both of said inlet openings, said collector housing between said inlet openings and said outlet opening having a partition-free interior portion, and said collector housing being further formed for discharge of exhaust gases from said inlet openings along opposite sides of a common interface boundary in said partition-free interior portion, said common interface having a substantial transverse length dimension.

18. A header assembly for an internal combustion engine comprising:

a pair of tubular header pipes each having an inlet end, a discharge end, and a substantially constant transverse cross sectional area proximate said discharge ends;

collector means mounted to said pipes and having a hollow collector housing with a partition-free interior portion and a pair of inlet openings coupled for receipt of exhaust gases from the discharge ends of said pipes, said housing having an outlet opening spaced from said inlet openings;

each of said inlet openings having a transverse cross sectional area substantially equal to said cross sectional area of each of said pipes, and said outlet opening having a transverse cross sectional area not substantially less than slightly smaller than the combined cross sectional areas of both of said pipes; and at least one of said collector housing and said pipes being formed for and directing the discharge of exhaust gases from said pipes into said partition-free interior portion of said housing along opposite sides of a common interface boundary in said interior portion of substantial transverse length dimension.

19. The collector assembly as defined in claim 18 wherein, said collector housing has convergently tapered wall proximate said inlet openings, and said housing has substantially parallel wall from said convergently tapered wall to said outlet opening.

20. The collector assembly as defined in claim 19 wherein, said substantially parallel wall has a length determined by a desired engine speed for maximum horsepower increase.

* * * * *

UNITED STATES PATENT AND TRADEMARK OFFICE
CERTIFICATE OF CORRECTION

PATENT NO. :  5,216,883

DATED : June 8, 1993

INVENTOR(S) : Ray T. Flugger

It is certified that error appears in the above-identified patent and that said Letters Patent is hereby corrected as shown below:

Column 7, line 27, delete "1-8-47-3-6-5-7-2" and
insert therefor ---1-8-4-3-6-5-7-2---.

Column 15, Claim 1, line 66, delete "dies" and
insert ---sides---

Signed and Sealed this

Fifteenth Day of February, 1994

Attest:

BRUCE LEHMAN

Attesting Officer

Commissioner of Patents and Trademarks